(12) United States Patent
Schumann et al.

(10) Patent No.: US 10,431,797 B2
(45) Date of Patent: Oct. 1, 2019

(54) SEPARATOR INCLUDING A POLYSULFIDE BARRIER LAYER FOR A BATTERY CELL, AND BATTERY CELL

(71) Applicant: Robert Bosch GmbH, Stuttgart (DE)

(72) Inventors: Bernd Schumann, Rutesheim (DE); Jean Fanous, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 15/512,403

(22) PCT Filed: Sep. 1, 2015

(86) PCT No.: PCT/EP2015/069931
§ 371 (c)(1),
(2) Date: Mar. 17, 2017

(87) PCT Pub. No.: WO2016/041770
PCT Pub. Date: Mar. 24, 2016

(65) Prior Publication Data
US 2017/0288191 A1    Oct. 5, 2017

(30) Foreign Application Priority Data

Sep. 18, 2014 (DE) .................. 10 2014 218 803

(51) Int. Cl.
*H01M 2/16* (2006.01)
*H01M 4/38* (2006.01)
(Continued)

(52) U.S. Cl.
CPC ......... *H01M 2/166* (2013.01); *H01M 2/1646* (2013.01); *H01M 2/1653* (2013.01);
(Continued)

(58) Field of Classification Search
CPC .. H01M 2/1646; H01M 2/1653; H01M 2/166; H01M 2/1686; H01M 4/38;
(Continued)

(56) References Cited

U.S. PATENT DOCUMENTS

| 3,625,771 A | 12/1971 | Arrance et al. |
| 2005/0042503 A1 | 2/2005 | Kim et al. |

(Continued)

FOREIGN PATENT DOCUMENTS

| CN | 103988337 A | 8/2014 |
| DE | 102012205931 A1 | 10/2013 |

(Continued)

OTHER PUBLICATIONS

International Search Report dated Nov. 26, 2015 issued in the International Patent Application No. PCT/EP2015/069931 filed Sep. 1, 2015.

*Primary Examiner* — Brittany L Raymond
(74) *Attorney, Agent, or Firm* — Norton Rose Fulbright US LLP; Gerard Messina

(57) ABSTRACT

A vehicle traction battery includes a battery cell, the battery cell including a cathode, and anode, and a separator the anode and cathode. The separator includes at least one protective layer that is impermeable to polysulfides and at least one ion-conducting conductive layer whose composition is different than that of the protective layer and that is designed as a copolymer which includes a stabilizing phase and an ionically conductive phase, the protective layer including an inorganic substance.

16 Claims, 6 Drawing Sheets

(51) Int. Cl.
 *H01M 10/42* (2006.01)
 *H01M 10/052* (2010.01)
(52) U.S. Cl.
 CPC ........... *H01M 2/1686* (2013.01); *H01M 4/38* (2013.01); *H01M 10/4235* (2013.01); *H01M 10/052* (2013.01); *H01M 2220/20* (2013.01); *Y02E 60/122* (2013.01)
(58) Field of Classification Search
 CPC ........... H01M 10/052; H01M 10/4235; H01M 2220/20; Y02E 60/122
 See application file for complete search history.

(56) References Cited

U.S. PATENT DOCUMENTS

2011/0081580 A1\* 4/2011 Stadler .................. H01M 4/131 429/319

2014/0342214 A1\* 11/2014 Wegner ............... H01M 2/1646 429/144
2015/0084604 A1\* 3/2015 Thillaiyan ............. H01M 4/628 320/162

FOREIGN PATENT DOCUMENTS

| DE | 102013018235 A1 | 4/2015 |
| JP | 2011096630 A | 5/2011 |
| WO | 2000/36671 A1 | 6/2000 |
| WO | 2006004366 A1 | 1/2006 |
| WO | 2006/088959 A2 | 8/2006 |
| WO | 2012131883 A1 | 10/2012 |
| WO | 2013087348 A2 | 6/2013 |
| WO | WO 2013-087348 \* | 6/2013 |

\* cited by examiner

SEPARATOR INCLUDING A POLYSULFIDE BARRIER LAYER FOR A BATTERY CELL, AND BATTERY CELL

CROSS-REFERENCE TO RELATED APPLICATIONS

The present application is the national stage of International Pat. App. No. PCT/EP2015/069931 filed Sep. 1, 2015, and claims priority under 35 U.S.C. § 119 to DE 10 2014 218 803.2, filed in the Federal Republic of Germany on Sep. 18, 2014.

FIELD OF THE INVENTION

The present invention relates to a separator for separating an anode and a cathode in a battery cell, a battery cell incorporating such a separator, and to a vehicle traction battery incorporating such a battery cell.

BACKGROUND

Separators are used in batteries, in particular in lithium-ion batteries, to separate the anode from the cathode and, in particular, to prevent short circuits. Ions, in particular lithium ions, migrate from one electrode to the other during the charging and discharging of the battery cell. For this purpose, the separator is designed to be ionically conductive. Chemical reactions take place on the cathode and on the diode during the operation of the battery cell. In particular, lithium-ion storage batteries exist, which include graphite anodes, in which lithium ions migrate from the anode to the cathode through a separator during discharging and are intercalated into a transition metal oxide, for example $Li_{1-x}Ni_{0.33}Mn_{0.33}O_2$. The lithium ions are intercalated into the anode during charging.

Lithium storage batteries that include metal anodes are also known, which contain, in particular, lithium. The cathode contains an organic or inorganic sulfur compound or pure sulfur. During discharging, lithium ions are chemically combined with the sulfur or the sulfur compound in the cathode, whereby polysulfides, for example, are formed. An electrolyte is situated between the electrochemically active sulfur compounds. Polysulfides, among other things, may be released thereby. The released polysulfides may accumulate on the anode and contaminate it and thereby destroy the battery cell.

It is known for separators made from organic materials, for example made from polyethylene or polypropylene, to be highly ionically conductive but also permeable to polysulfides. Separators made from inorganic materials are furthermore known, which are not permeable to polysulfides, but which have a relatively low conductivity for ions.

In the battery cell, lithium ions which are deposited onto the anode during charging may form dendrites thereon, which grow toward the cathode through the separator and trigger a short circuit upon reaching the cathode. Dendrites of this type may penetrate, in particular, separators made from organic materials.

A separator is known from U.S. Pat. No. 3,625,771, which includes a polymer mixture as well as particles of inorganic materials. Polysulfones, polyepoxides, and polyphenyl oxide, for example, are provided in the polymer mixture.

WO 00/336671 A1 describes a separator, including a microporous pseudoboehmite layer, which is in contact with a protective layer. The protective layer includes a polymer made from multiple monomers, for example acrylates, styrene or epoxide. The protective layer can also include a mixture of organic and inorganic material.

A separator for batteries is also described in WO 2006/088 959 A2. The separator contains a layer of additives, for example clay, clay minerals as well as metal sulfides.

SUMMARY

According to an example embodiment of the present invention, a separator, for separating an anode and a cathode in a battery cell, includes at least one protective layer that is impermeable to polysulfides and at least one ion-conducting conductive layer whose composition is different than that of the protective layer. The conductive layer is designed as a copolymer, which includes a stabilizing phase and an ionically conductive phase. The protective layer includes an inorganic substance.

According to an example embodiment of the present invention, the inorganic substance of the protective layer includes chemically reactive particles that react with polysulfides. The protective layer acts as a getter layer. The inorganic substance can also be made entirely from the aforementioned chemically reactive particles.

The chemically reactive particles of the protective layer, for example, contain an alkali metal or an alkali metal compound or they are made from an alkali metal or an alkali metal compound.

Alternatively, the chemically reactive particles of the protective layer contain an alkaline earth metal or an alkaline earth metal compound, or they are made from an alkaline earth metal or an alkaline earth metal compound.

The chemically reactive particles of the protective layer are preferably situated a distance from each other, clearances remaining between the chemically reactive particles.

According to an example embodiment of the present invention, the inorganic substance of the protective layer includes composite particles that are situated close together, multiple of the composite particles being in contact with each other. This results in a tight bond which is impermeable to liquids and chemicals, in particular to polysulfides. The protective layer thus acts as a barrier layer. The inorganic substance of the protective layer is ion-conducting and can be introduced into the separator on both sides.

The composite particles of the protective layer contain, for example, ion-conducting ceramic or are made from ion-conducting ceramic.

According to a example embodiment a getter layer is provided in combination with a barrier layer.

Alternatively, the composite particles of the protective layer contain argyrodite or are made from argyrodite.

The ionically conductive phase in the copolymer of the conductive layer preferably contains acrylate or polyethylene oxide.

According to an example embodiment of the present invention, a battery cell includes at least one separator as described herein.

According to an example embodiment of the present invention, a battery cell including a separator as described herein is advantageously used in a traction battery of a vehicle, in particular a hybrid vehicle (HEV), a plug-in hybrid vehicle (PHEV), or an electric vehicle (EV).

The barrier layer as well as the getter layer as the protective layer of the separator reliably prevent polysulfides from migrating from the cathode to the anode and accumulating thereon. The solid ceramic, inorganic barrier layer of the separator furthermore prevents dendrites growing on the anode from reaching the cathode and thereby triggering a short circuit. However, the separator nevertheless has a relatively high conductivity for ions. In addition, the protective layer of the separator is also designed to be hermetically impermeable to gases, liquids and chemicals. This is particularly advantageous for lithium-sulfur cells or lithium-air cells, in which decomposition products, such as carbon dioxide, are released during the electrochemical reactions which occur. The separator has a mechanically strong yet flexible design and can thus be rolled or folded between the cathode and the anode during assembly.

Specific example embodiments of the present invention are explained in greater detail on the basis of the drawings and the following description.

DETAILED DESCRIPTION

According to example embodiments of the present invention, a separator 1 is situated between an anode and a cathode in a battery cell. Separator 1 is designed to be ionically conductive, on the one hand, and prevents a through-flow of contaminating substances, in particular polysulfides and sulfur, from the cathode to the anode, on the other hand. Separator 1 is furthermore used mechanically as a spacer between the anode and the cathode and prevents a short circuit between the anode and the cathode.

Figure 1:
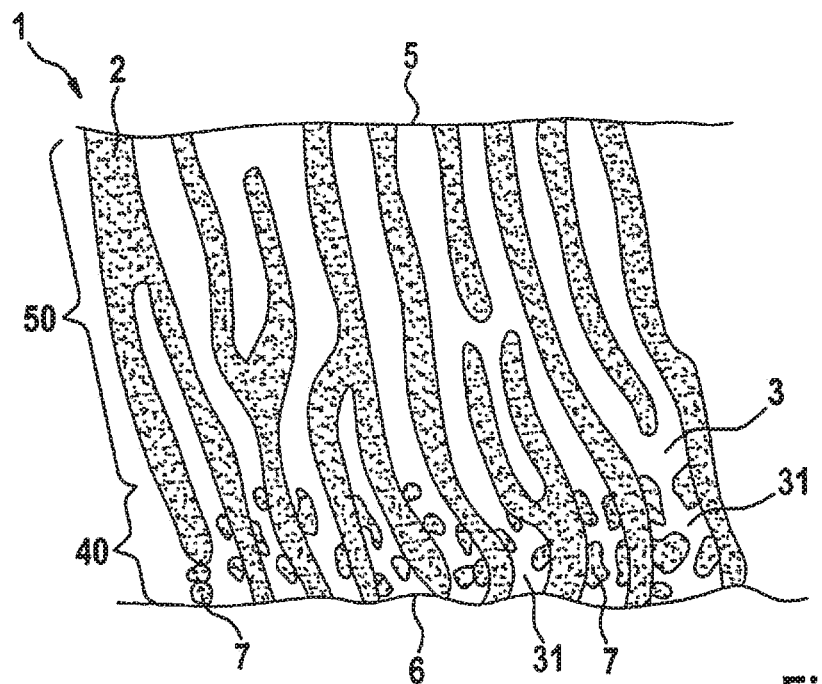
FIG. 1 is a sectional view of a separator, including a getter layer, according to an example embodiment of the present invention.

A separator 1 according to a first exemplary embodiment, which is illustrated in FIG. 1, includes a protective layer 40 acting as a getter layer and a conductive layer 50, which abut each other. Protective layer 40 is delimited by an underside 6 on its side facing away from conductive layer 50, and conductive layer 50 is delimited by an upper side 5 on its side facing away from protective layer 40.

Conductive layer 50 of separator 1 is designed as a copolymer and has a mechanically stabilizing phase 2 as well as an ionically conductive phase 3. Stabilizing phase 2 effectuates the mechanical strength of separator 1 and contains, for example, polystyrene, epoxides and/or siloxanes.

Ionically conductive phase 3 of separator 1 is used to conduct ions through separator 1 and contains, for example, polyethylene oxide (polyethylene glycol) and/or acrylates. To increase the ion conductivity, a conductive salt, which is not illustrated here, can be optionally embedded in ionically conductive phase 3.

In the present case, conductive layer 50 transitions smoothly into protective layer 40. Protective layer 40 is also designed as a copolymer and has a mechanically stabilizing phase 2 as well as an ionically conductive phase 3. Chemically reactive particles 7 are embedded in ionically conductive phase 3. Chemically reactive particles 7 are distributed at a distance from each other in ionically conductive phase 3, so that clearances 31 remain between chemically reactive particles 7. Aforementioned clearances 31 ensure a relatively good ion conduction through ionically conductive phase 3 of protective layer 40 and through separator 1.

Chemically reactive particles 7 contain an inorganic substance and react, in particular, with polysulfides, which come from the cathode. Chemically reactive particles 7 thus prevent polysulfides and other substances that may contaminate the anode from penetrating protective layer 40 and thus separator 1.

Aforementioned clearances 31 are configured in a size which ensures that a sufficiently large space is possible for conducting the ions through ionically conductive phase 3 of protective layer 40 even after a reaction of chemically reactive particles 7 with polysulfides.

For example, alkali metals, alkali metal compounds, alkaline earth metals, alkaline earth metal compounds as well as other metals and chemical compounds can be considered as materials for chemically reactive particles 7.

Figure 2:
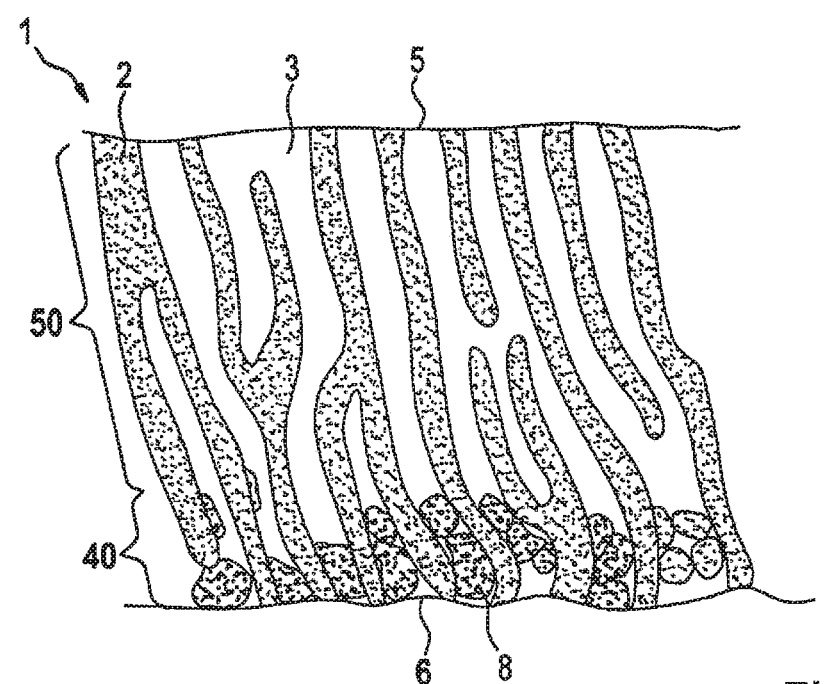
FIG. 2 is a sectional view of a separator, including a barrier layer, according to an example embodiment of the present invention.

A separator 1 according to a second exemplary embodiment, which is illustrated in FIG. 2, has a similar structure to the first exemplary embodiment and includes a protective layer 40 and a conductive layer 50, which abut each other. Conductive layer 50 has the same structure as the one in the first exemplary embodiment.

In contrast to the first exemplary embodiment, composite particles 8 are embedded in ionically conductive phase 3 of protective layer 40 acting as a barrier layer. Composite particles 8 are arranged close together in ionically conductive layer 3 and are in contact with each other. Composite particles 8 thus prevent polysulfides and other substances that may contaminate the anode from penetrating protective layer 40 and thus separator 1. Composite particles 8 are used as a protective layer for thermal events. Composite particles 8 conduct lithium ions sufficiently well.

Composite particles 8 contain an inorganic substance, for example, an oxide, a ceramic, a garnet, garnet-like $Li_7La_3Zr_2O_{12}$ (LLZO), a glass-ceramic membrane referred to as LISICON, a non-oxidic ion conductor such as sulfur or phosphorus, an argyrodite, or a lithium argyrodite.

Composite particles 8 are ionically conductive but have a lower ion conductivity than ionically conductive phase 3 of the copolymer. Protective layer 40 has a relatively thin design. The mechanical stability of separator 1 is ensured by stabilizing phase 2 in the copolymer of conductive layer 50.

Figure 3:
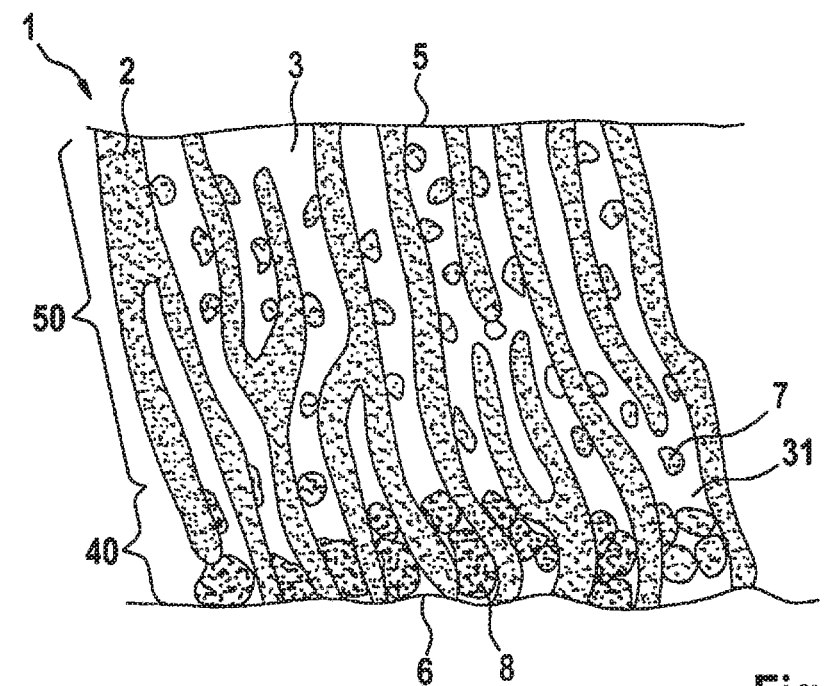
FIG. 3 is a sectional view of a separator according to another example embodiment of the present invention.

A separator 1 according to a third exemplary embodiment, which is illustrated in FIG. 3, has a similar structure to the second exemplary embodiment and includes a protective layer 40 acting as a barrier layer and a conductive layer 50, which abut each other. Conductive layer 40 has the same structure as the one in the second exemplary embodiment.

In contrast to the second exemplary embodiment, chemically reactive particles 7 are embedded in ionically conductive phase 3 of conductive layer 50, similarly to the protective layer according to the first exemplary embodiment.

Separator 1 according to the third exemplary embodiment thus includes a conductive layer 50, which has chemically reactive particles 7, and a protective layer 40 acting as a barrier layer, which includes composite particles 8. A separator 1 of this type is preferably situated in a battery cell in such a way that conductive layer 50 faces the anode and protective layer 40 faces the cathode.

Polysulfides, which can still penetrate through protective layer 40 to a limited degree between composite particles 8, react in conductive layer 50 with chemically reactive particles 7 present therein. Composite particles 8 increase the strength of separator 1. Composite particles 8 which are situated close together, furthermore prevent dendrites that spread from the anode and partially penetrate separator 1 from forcing chemically reactive particles 7 out of separator 1.

Figure 4:
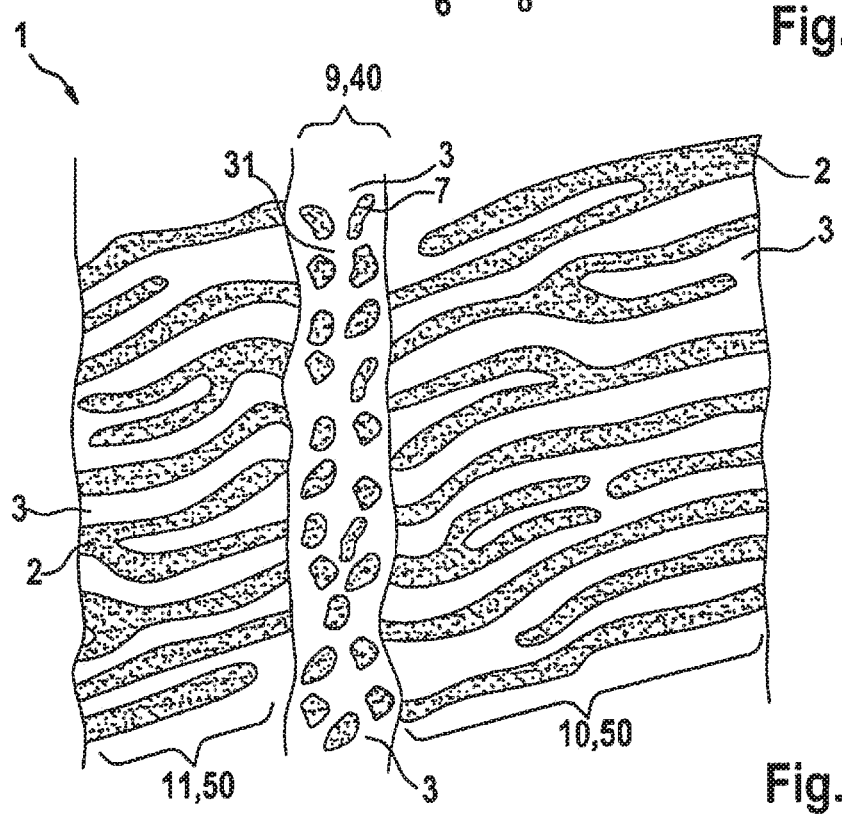
FIG. 4 is a sectional view of a separator with a three-part design, including a getter layer, according to an example embodiment of the present invention.

A separator 1 according to a fourth exemplary embodiment is illustrated in FIG. 4. Separator 1 includes two conductive layers 50, which are also referred to as upper layer 10 and lower layer 11, as well as a protective layer 40 acting as a getter layer, which is also referred to as inner layer 9. Inner layer 9 is situated between upper layer 10 and lower layer 11.

Upper layer 10 and lower layer 11 are each designed as a copolymer and each have a mechanically stabilizing phase 2 as well as an ionically conductive phase 3. Inner layer 9 has only one ionically conductive phase 3, in which chemically reactive particles 7 are embedded.

Clearances 31 remain between chemically reactive particles 7. The materials specified in relation to the first exemplary embodiment can also be used as materials for chemically reactive particles 7.

The three-layer structure of separator 1, in which protective layer 40 is surrounded on both sides by a conductive layer 50 made from a copolymer, prevents protective layer 40 from coming into direct contact with the anode and with the cathode. As a result, undesirable chemical reactions of the anode material and the cathode material with chemically reactive particles 7 in protective layer 40 are avoided.

Figure 5:
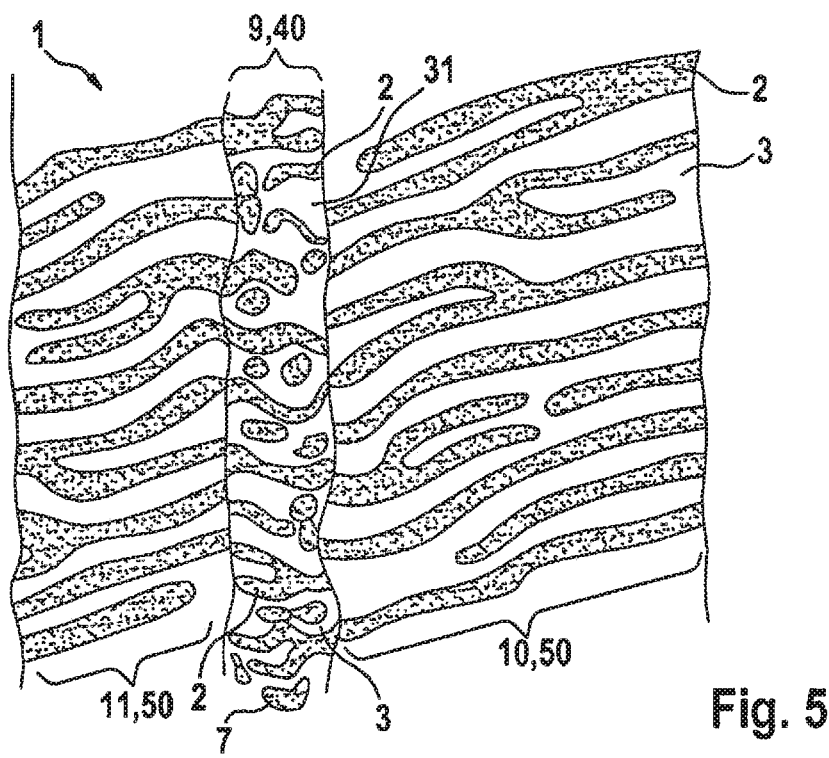
FIG. 5 is a sectional view of a separator having a three-part design, including a getter layer, according to another example embodiment of the present invention.

A separator 1 according to a fifth exemplary embodiment is illustrated in FIG. 5 and also includes two conductive layers 50, which are also referred to as upper layer 10 and lower layer 11, as well as a protective layer 40 acting as a getter layer, which is also referred to as inner layer 9. As in the fourth exemplary embodiment, inner layer 9 is situated between upper layer 10 and lower layer 11. Upper layer 10 and lower layer 11 are each designed as a copolymer and, as in the fourth exemplary embodiment, each has a mechanically stabilizing phase 2 as well as an ionically conductive phase 3.

Inner layer 9 is also designed as a copolymer and has a mechanically stabilizing phase 2 as well as an ionically conductive phase 3. Stabilizing phase 2 increases the adhesive forces between upper layer 10 as well as lower layer 11 and inner layer 9 and thereby increases the strength of separator 1.

Chemically reactive particles 7 are embedded in ionically conductive phase 3 of inner layer 9. Clearances 31 remain between chemically reactive particles 7 in inner layer 9. The materials specified in relation to the first exemplary embodiment can also be used as materials for chemically reactive particles 7.

The three-layer structure of separator 1, in which protective layer 40 is surrounded on both sides by a conductive layer 50 made from a copolymer, prevents protective layer 40 from coming into direct contact with the anode and with the cathode. As a result, undesirable chemical reactions of the anode material and the cathode material with chemically reactive particles 7 in protective layer 40 are avoided.

Figure 6:
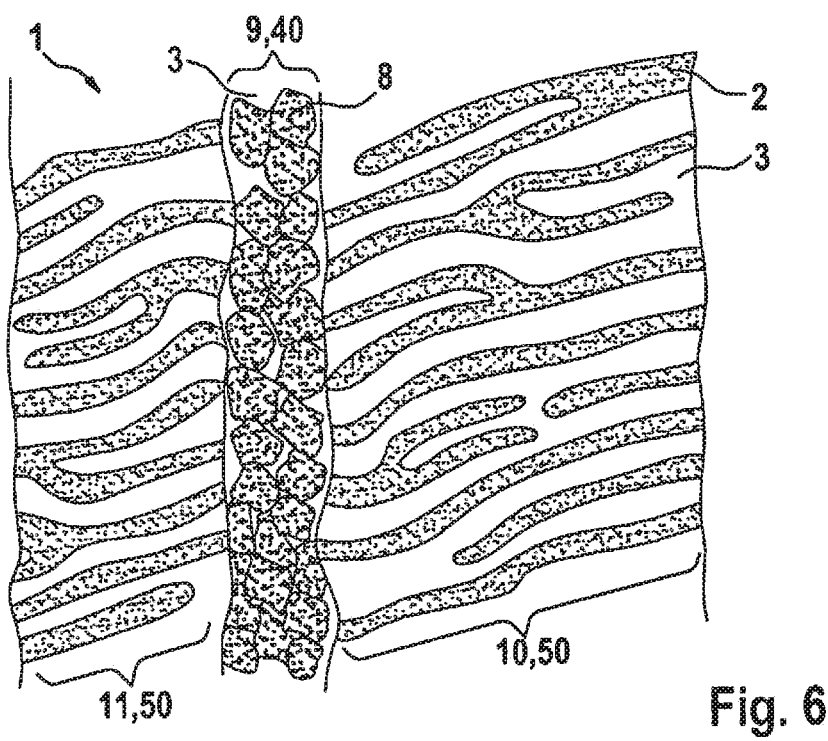
FIG. 6 is a sectional view of a separator having a three-part design, including a barrier layer, according to an example embodiment of the present invention.

A separator 1 according to a sixth exemplary embodiment, which is illustrated in FIG. 6, has a similar structure to the fourth exemplary embodiment. Separator 1 includes two conductive layers 50, which are also referred to as upper layer 10 and lower layer 11, as well as a protective layer 40 acting as a barrier layer, which is also referred to as inner layer 9. As in the fourth exemplary embodiment, inner layer 9 is situated between upper layer 10 and lower layer 11.

Upper layer 10 and lower layer 11 are each designed as a copolymer and each has a mechanically stabilizing phase 2 as well as an ionically conductive phase 3. Inner layer 9 has only one ionically conductive phase 3, in which composite particles 8 are embedded. Composite particles 8 are arranged close together in ionically conductive phase 3 and are in contact with each other. The materials specified in relation to the second exemplary embodiment can also be used as materials for composite particles 8.

The three-layer structure of separator 1, in which protective layer 40 is surrounded on both sides by a conductive layer 50 made from a copolymer, prevents protective layer 40 from coming into direct contact with the anode and with the cathode. As a result, undesirable chemical reactions of the anode material and the cathode material with composite particles 8 in protective layer 40 are avoided.

Figure 7:
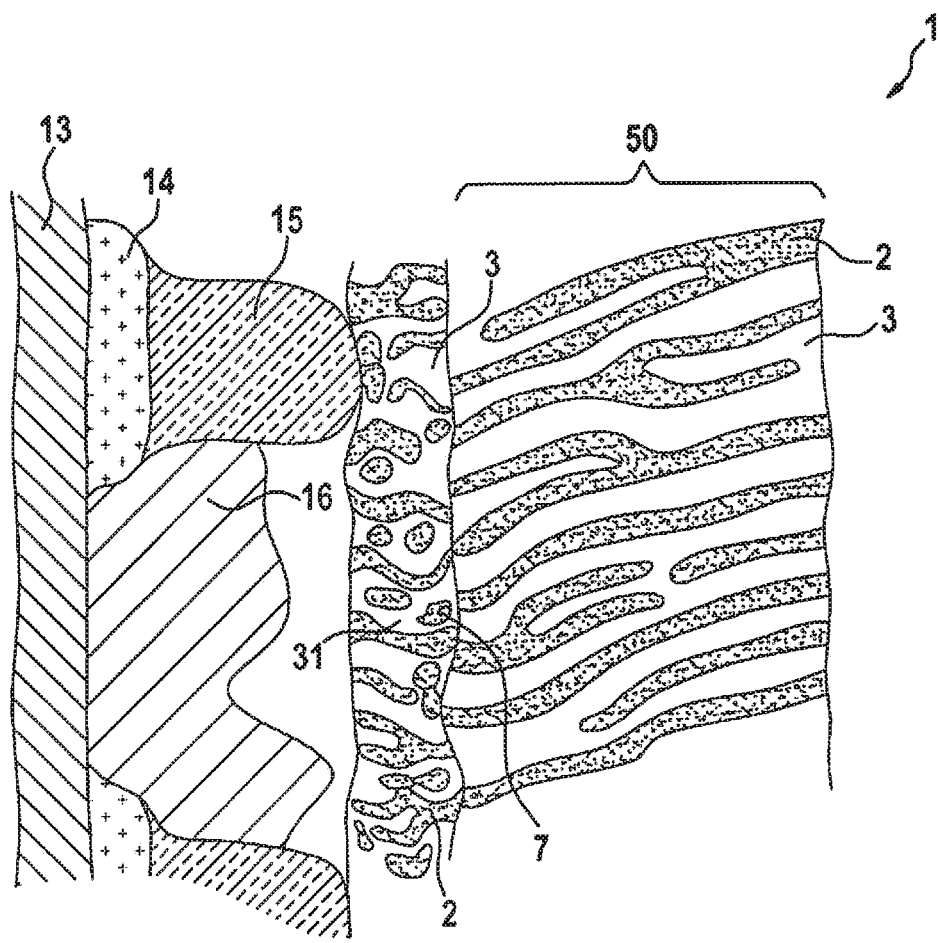
FIG. 7 is a sectional view of a part of a battery cell including a two-part separator having a getter layer, according to an example embodiment of the present invention.

A separator 1 according to a seventh exemplary embodiment in a battery cell is illustrated in FIG. 7. The battery cell includes an anode arrangement having a current collector 13, on which an anode material 16 is applied. In the present case, current collector 13 is a copper film. Anode material 16 is an electrochemically active material, such as lithium, magnesium or sodium.

Carrier platelets 14 are also applied on current collector 13, which are made from a polymer or a metal polymer composite material, for example a copper polymer composite material. Insulators 15 are situated on carrier platelets 14 on the side facing away from current collector 13 in each case.

Separator 1 includes a protective layer 40 acting as a getter layer and a conductive layer 50, which abut each other. Protective layer 40 abuts insulators 15. Insulators 15 project farther away from current collector 13 than anode material 16. A direct contact between protective layer 40 of separator 1 and anode material 16 is thus avoided.

Conductive layer 50 of separator 1 is designed as a copolymer and has a mechanically stabilizing phase 2 as well as an ionically conductive phase 3. Protective layer 40 is also designed as a copolymer and has a mechanically stabilizing phase 2 as well as an ionically conductive phase 3. Chemically reactive particles 7 are embedded in ionically conductive phase 3 of protective layer 40. Clearances 31 remain between chemically reactive particles 7. The materials specified in relation to the first exemplary embodiment can also be used as materials for chemically reactive particles 7.

Figure 8:
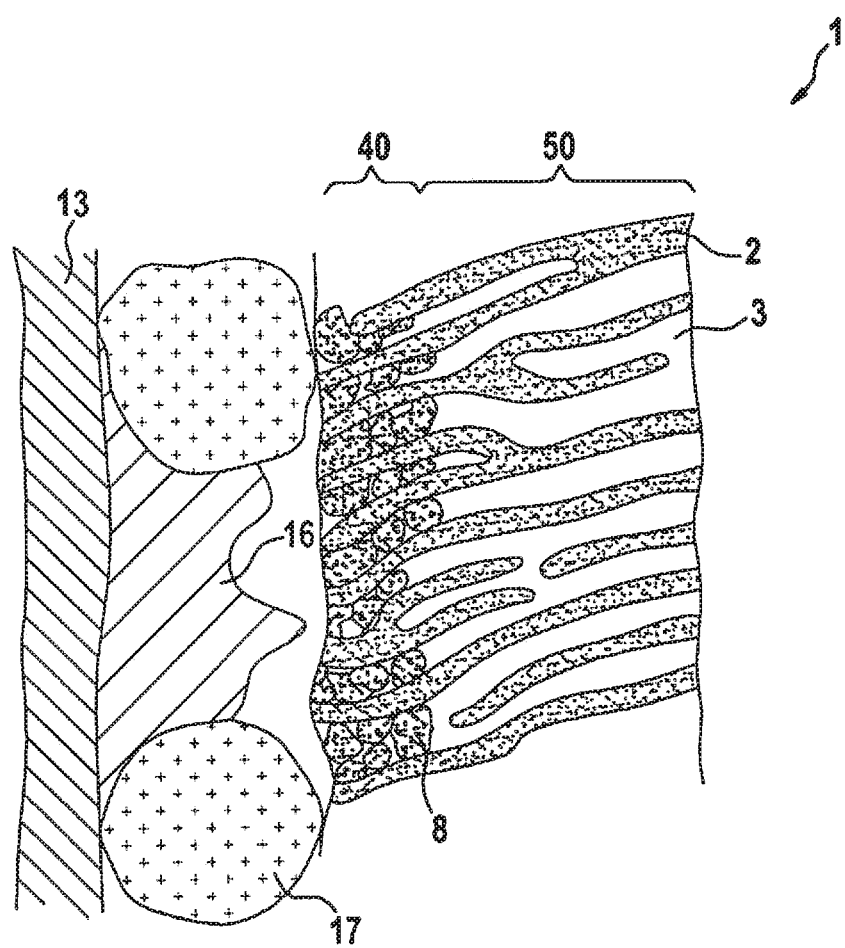
FIG. 8 is sectional view of a part of a modification of the battery cell of FIG. 7, including a two-part separator having a barrier layer, according to an example embodiment of the present invention.

FIG. 8 shows a modification of the battery cell from FIG. 7. The battery cell includes an anode arrangement having a current collector 13, on which an anode material 16 is applied. Carrier particles 17 are furthermore applied on current collector 13 for supporting separator 1. Carrier particles 17 project farther away from current collector 13 than anode material 16. A direct contact between separator 1 and anode material 16 is thus avoided.

In the present case, separator 1 is structured as described in the second exemplary embodiment. Protective layer 40 of separator 1, which acts as a barrier layer, faces current collector 13 of anode arrangement and rests on carrier particles 17. However, a separator according to another exemplary embodiment can also be used.

Figure 9:
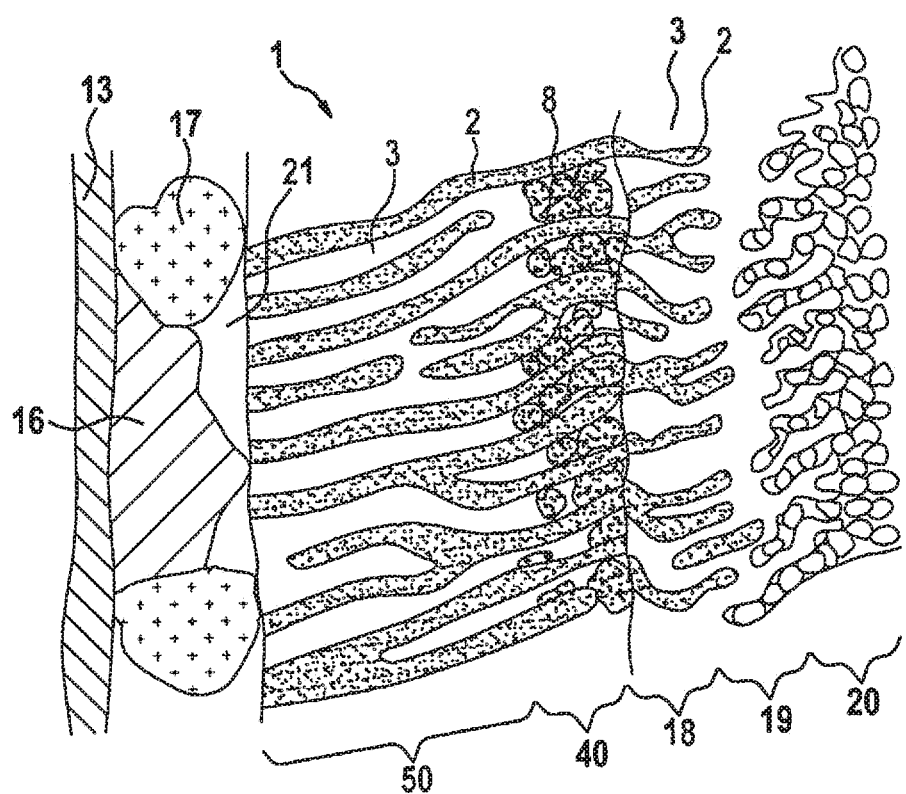
FIG. 9 is a sectional view of a part of another modification of the battery cell from FIG. 7, according to another example embodiment of the present invention.

FIG. 9 also shows a modification of the battery cell from FIG. 7. The battery cell includes an anode arrangement having a current collector 13, on which an anode material 16 is applied. Carrier particles 17, which are used to support separator 1, are furthermore applied on current collector 13.

Clearances 21 remaining between separator 1 and anode material 16 are filled with ionically conductive material. For example, the materials of the ionically conductive phase of the copolymer of separator 1 or a mixture of an electrolyte and the ionically conductive phase of the copolymer as well as a liquid or a gel-like electrolyte are suitable for this purpose.

In the present case, separator 1 is structured as described in the second exemplary embodiment.

Conductive layer 50 of separator 1 faces current collector 13 of anode arrangement and rests on carrier particles 17. However, a separator according to another exemplary embodiment can also be used.

The battery cell furthermore includes a cathode arrangement having a cathode layer 20, which is essentially made from compressed, electrochemically active material. Cathode layer 20 can also contain material of the ionically conductive phase of the copolymer of separator 1 as well as an electrolyte. The cathode arrangement furthermore includes a mixed layer 19, which includes more porous electrochemically active material having a larger surface, compared to cathode layer 20.

An intermediate layer 18 is situated between protective layer 40 of separator 1, which acts as a barrier layer, and mixed layer 19. Mixed layer 19 contains a copolymer having a stabilizing phase 2 and an ionically conductive phase 3. A greater proportion of ionically conductive phase 3 and a smaller proportion of stabilizing phase 2 is included, compared to the copolymer of separator 1.

The present invention is not limited to the exemplary embodiments described here and to the aspects highlighted therein. Instead, a large number of modifications are possible within the range specified by the claims, which lie within the purview of those skilled in the art.

What is claimed is:

1. A separator for separating an anode and a cathode in a battery cell, comprising:
    a copolymer ion-conducting conductive layer that includes a stabilizing phase and an ionically conductive phase, wherein the stabilizing phase effectuates a mechanical strength of the separator, and wherein the ionically conductive phase of the separator is used to conduct ions through the separator; and
    a protective layer whose composition is different than a composition of the conductive layer, that is impermeable to polysulfides, and includes an inorganic substance;
    wherein the conductive layer transitions into the protective layer,
    wherein the protective layer includes a copolymer and has a mechanically stabilizing phase and an ionically conductive phase, wherein chemically reactive particles are embedded in the ionically conductive phase and the chemically reactive particles are distributed at a distance from each other in the ionically conductive phase, so that clearances remain between the chemically reactive particles to provide ion conduction through the ionically conductive phase of the protective layer and through the separator.

2. The separator of claim 1, wherein the inorganic substance of the protective layer includes the chemically reactive particles that react with polysulfides.

3. The separator of claim 2, wherein the chemically reactive particles consist of an alkali metal or an alkali metal compound.

4. The separator of claim 2, wherein the chemically reactive particles contain an alkaline earth metal or an alkaline earth metal compound.

5. The separator of claim 2, wherein the chemically reactive particles consist of an alkaline earth metal or an alkaline earth metal compound.

6. The separator of claim 2, wherein the chemically reactive particles are situated at a distance from each other, with clearances remaining between the chemically reactive particles.

7. The separator of claim 1, wherein the inorganic substance of the protective layer includes composite particles that are arranged close together; and wherein a plurality of the composite particles are in contact with each other.

8. The separator of claim 7, wherein the composite particles contain an ion-conducting ceramic.

9. The separator of claim 7, wherein the composite particles consist of an ion-conducting ceramic.

10. The separator of claim 7, wherein the composite particles contain an argyrodite.

11. The separator of claim 7, wherein the composite particles consist of an argyrodite.

12. The separator of claim 1, wherein the ionically conductive phase contains acrylates.

13. The separator of claim 1, wherein composite particles contain an inorganic substance, including at least one of an oxide, a ceramic, a garnet, a garnet-like material of $Li_7La_3Zr_2O_{12}$ (LLZO), a glass-ceramic membrane (LISICON), a non-oxidic ion conductor, an argyrodite, or a lithium argyrodite.

14. A separator for separating an anode and a cathode in a battery cell, comprising:
    a copolymer ion-conducting conductive layer that includes a stabilizing phase and an ionically conductive phase; and
    a protective layer whose composition is different than a composition of the conductive layer, that is impermeable to polysulfides, and includes an inorganic substance;
    wherein the inorganic substance of the protective layer includes chemically reactive particles that react with polysulfides, and
    wherein the chemically reactive particles contain an alkali metal or an alkali metal compound.

15. A battery cell, comprising:
    an anode;
    a cathode;
    a separator that separates the anode and the cathode from each other and that includes: a copolymer ion-conducting conductive layer that includes a stabilizing phase and an ionically conductive phase, wherein the stabilizing phase effectuates a mechanical strength of the separator, and wherein the ionically conductive phase of the separator is used to conduct ions through the separator; and a protective layer whose composition is different than a composition of the conductive layer, that is impermeable to polysulfides, and includes an inorganic substance;

wherein the conductive layer transitions into the protective layer, wherein the protective layer includes a copolymer and has a mechanically stabilizing phase and an ionically conductive phase, wherein chemically reactive particles are embedded in the ionically conductive phase and the chemically reactive particles are distributed at a distance from each other in the ionically conductive phase, so that clearances remain between the chemically reactive particles to provide ion conduction through the ionically conductive phase of the protective layer and through the separator.

16. The battery cell of claim 15, wherein composite particles contain an inorganic substance, including at least one of an oxide, a ceramic, a garnet, a garnet-like material of $Li_7La_3Zr_2O_{12}$ (LLZO), a glass-ceramic membrane (LISICON), a non-oxidic ion conductor, an argyrodite, or a lithium argyrodite.

* * * * *